(12) United States Patent
Markh

(10) Patent No.: US 12,333,521 B2
(45) Date of Patent: Jun. 17, 2025

(54) PORTABLE DEVICE-BASED TRANSACTION

(71) Applicant: Visa International Service Association, San Francisco, CA (US)

(72) Inventor: John Markh, Burlington (CA)

(73) Assignee: Visa International Service Association, San Francisco, CA (US)

( * ) Notice: Subject to any disclaimer, the term of this patent is extended or adjusted under 35 U.S.C. 154(b) by 77 days.

(21) Appl. No.: 18/146,318

(22) Filed: Dec. 23, 2022

(65) Prior Publication Data

US 2024/0211924 A1  Jun. 27, 2024

(51) Int. Cl.
*G06Q 20/40* (2012.01)
*G06Q 20/32* (2012.01)

(52) U.S. Cl.
CPC ..... *G06Q 20/3278* (2013.01); *G06Q 20/4015* (2020.05)

(58) Field of Classification Search
None
See application file for complete search history.

(56) References Cited

U.S. PATENT DOCUMENTS

| | | | | |
|---|---|---|---|---|
| 2011/0166878 A1* | 7/2011 | Louie | ...................... | G07F 9/002 705/2 |
| 2015/0178532 A1* | 6/2015 | Brule | ................... | G06Q 20/321 705/41 |
| 2015/0213436 A1* | 7/2015 | Griffin | .................. | H04W 12/06 705/44 |
| 2015/0294303 A1* | 10/2015 | Hanson | .............. | G06Q 20/3278 235/379 |
| 2020/0137573 A1* | 4/2020 | Chen | ....................... | H04W 4/80 |
| 2020/0387887 A1* | 12/2020 | Rathod | .............. | G06Q 20/3224 |
| 2022/0358484 A1* | 11/2022 | Brudnicki | ........... | H04W 12/068 |

* cited by examiner

*Primary Examiner* — Peter D Nolan
*Assistant Examiner* — Matthew Cobb
(74) *Attorney, Agent, or Firm* — Kilpatrick Townsend & Stockton LLP

(57) ABSTRACT

Embodiments are directed to using an NFC capable portable device to conduct a transaction at a resource provider location. The portable device (e.g., a wearable device, a physical token) may be temporarily associated with a user account at the resource provider location. The resource provider location includes one or more terminals that are configured to generate a list of items (e.g., items picked by the user) to be associated with the portable device. At checkout, the user surrenders the portable device, items on the list get automatically charged to the user account, and the user leaves the resource provider location. All communication between terminals, portable device and the resource provider computer occurs over a closed, local area network. Among the terminals, portable device and the resource provider computer, the resource provider computer is the only device configured to communicate with external entities over an external network.

18 Claims, 5 Drawing Sheets

PORTABLE DEVICE-BASED TRANSACTION

CROSS-REFERENCES TO RELATED APPLICATIONS

None.

BACKGROUND

Various merchants implement techniques for frictionless shopping experience. These techniques include deploying sophisticated solutions such as artificial intelligence (AI) powered cameras to analyze in real-time the actions of consumers, smart internet of things (IoT) devices capable of processing payment transactions supporting variety of payment instruments (e.g., payment cards, wearables, QR-based payments, biometric-based payments), or purpose-built payment terminals in multiple locations throughout the retail locations.

However, these techniques are very complex to design, develop, deploy, operate and secure. For example, purpose-build payment terminals are required to undergo security evaluation to security standards such as PCI PTS POI Modular Security Requirements, which requires features such as tamper-resistance and tamper-responsiveness. In addition, the merchants are required to secure all areas where payment information is processed according to PCI Data Security Standard, which can be onerous and costly. Moreover, a payment process that introduces friction (e.g., PIN entry on a payment terminal or delay in processing a payment transaction) inhibits impulse-based shopping experience.

Another drawback of the current systems is the load that they create over the communication network, as well as their carbon footprint. Specifically, conventional systems implementing techniques for frictionless shopping experience are configured to communicate with a back-end system constantly, transmitting video images of the AI powered cameras thereby generating gigabytes of traffic over the network.

Embodiments address these problems and other problems individually and collectively.

BRIEF SUMMARY

Embodiments are directed to methods, apparatuses, computer readable media and systems for using a Near Field Communication (NFC) capable portable device to conduct a transaction at a resource provider location. The portable device may be a simple device (e.g., a "dumb" device), such that the portable device is not connected (or is not capable of being connected) to the Internet, and is not configured to communicate with external entities outside the confines of the resource provider location. The portable device (e.g., a wearable device, a physical token) may be temporarily associated with a user account at the resource provider location. The resource provider location includes one or more terminals that are configured to generate a list of items (e.g., items picked by the user) to be associated with the portable device. At checkout, the user surrenders the portable device, items on the list get automatically charged to the user account, and the user leaves the merchant location. All communication between terminals, portable device and the merchant computer occurs over a closed, local area network. Among the terminals, portable device and the resource provider computer, the resource provider computer is the only device configured to communicate with external entities over an external communication network (e.g., over the Internet).

One embodiment is directed to a method comprising temporarily associating, by a resource provider computer, a portable device with a user account, wherein the portable device comprises a machine-readable tag. In some embodiments, the machine-readable tag may be an NFC tag. The resource provider computer may receive, from one or more terminals provided at the resource provider location via an internal communication network, at least one request to associate one or more items with the portable device. The resource provider computer may receive, via the internal communication network, a request to check-out. The resource provider computer may generate a transaction authorization request for the one or more items associated with the portable device, and transmit the transaction authorization request to a processing server computer via an external communication network. The resource provider computer may disassociate the portable device from the user account upon receiving the request or indication to check-out.

In some embodiments, receiving the request to check-out further comprises detecting, by the resource provider computer via the internal communication network, the portable device being returned at a predetermined location or passing through an exit terminal. The resource provider computer may also detect, via the internal communication network, the one or more items passing through the exit terminal.

In some embodiments, a terminal among the one or more terminals communicatively coupled to the resource provider computer over the internal communication network may read a label associated with an item among the one or more items. The label may be an NFC label. In some embodiment, the terminal may acquire data stored at the label associated with the item, identify the item using the acquired data, identify information associated with the item, and output the information associated with the item. For example, the terminal may display the information on a monitor of the terminal. The terminal may read the machine-readable tag associated with the portable device and transmit, to the resource provider computer via the internal communication network, a request to associate the item with the portable device. The resource provider computer may associate the item with the portable device.

Another embodiment is directed to a system comprising resource provider computer. The resource provider computer comprises a processor and a computer-readable medium coupled to the processor. The computer-readable medium comprises code, executable by the processor, for performing a method comprising temporarily associating, by a resource provider computer, a portable device with a user account, wherein the portable device comprises a machine-readable tag. In some embodiments, the machine-readable tag may be an NFC tag. The method may include receiving, from one or more terminals provide at the resource provider location via an internal communication network, at least one request to associate one or more items with the portable device. The method may also include receiving, via the internal communication network, a request to check-out. The method may include generating a transaction authorization request for the one or more items associated with the portable device, and transmit the transaction authorization request to a processing server computer via an external communication network. The method may include disassociating the portable device from the user account upon receiving the request or indication to check-out.

In some embodiments, the system may also include the one or more terminals configured to communicate with the resource provider computer via the internal communication network exclusive to the one or more terminals and the resource provider computer. In some embodiments, the system may include the portable device.

These and other embodiments are described in further detail below.

DETAILED DESCRIPTION

Figure 1:
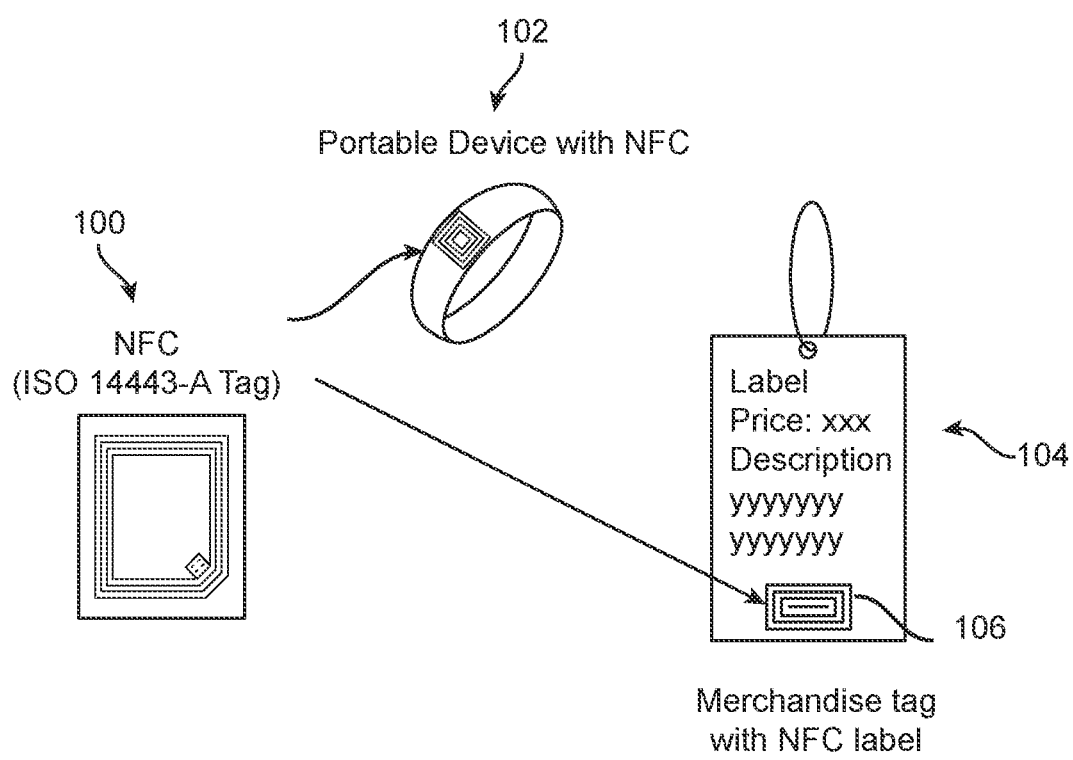
FIG. 1 shows a block diagram of an exemplary machine-readable tag system, according to some embodiments.

Embodiments are directed to systems and methods for using a Near Field Communication (NFC) capable portable device to conduct a transaction. The portable device may be a simple device (e.g., a dumb device), such that the portable device is not connected (or is not capable of being connected) to the Internet, and is not configured to communicate with external entities outside the confines of the merchant location. According to various embodiment, the portable device (e.g., a wearable device, a physical token) may be temporarily associated with a user account at a resource provider location (e.g., merchant location). The resource provider location may include one or more terminals that are configured to generate a list of items (e.g., items picked by the user for purchasing) to be associated with the portable device. The terminal(s) may be a simple device, such that the terminal(s) is not connected to the Internet, and is not configured to communicate with external entities outside the confines of the resource provider location. At checkout, the items on the list are charged to the user account, and the user may simply leave the resource provider location. In some embodiments, the user may keep the portable device. Alternatively, the portable device may be returned to the merchant and re-purposed for another user.

According to various embodiments, the portable device may include a fashionable wearable device. The portable device is not configured as a smart device that would enable the portable device to communicate with other devices over an open network or communication channel. Rather, the portable device is configured as a physical token (e.g., a ring, a bracelet, or a fob) capable of contactless communication with devices in the resource provider system, within the resource provider location. In some embodiments, the portable device is configured for one-way communication. For example, the portable device may include a uniquely programmed NFC tag. When the portable device is assigned to a user (e.g., consumer), the portable device may be temporarily associated with a user account (e.g., a payment account of the user). For example, the association may be for the duration of a user's visit at the resource provider location. Associating the portable device with the user account may pre-authorize (e.g., put a hold on) a predetermined amount to be charged on the user account. In some embodiments, associating the portable device with the user account may include sending a preauthorization request to an issuer of the user account, and receiving a confirmation of the preauthorization indicating that the user account is valid, active and is not restricted in any way.

The resource provider may also tag the merchandise items with uniquely programmed NFC labels, similar to the portable devices. Each merchandise item may include a unique, individual NFC label identifying the merchandise item. The resource provider may deploy one or more terminals at the resource provider location. The terminals may be configured to read the NFC tag on the portable device, as well as the NFC label on the merchandise item(s). For example, the user may present the portable device to a terminal provided at the resource provider location, which will retrieve the identifier of the portable device from the NFC tag. The user may present the NFC label on a merchandise item to the terminal, which will retrieve the identifier of the merchandise item from the NFC label. While in some embodiments, the terminal may read the NFC label of the merchandise item followed by NFC tag of the portable device, in other embodiments the terminal may first read the NFC tag of the portable device followed by the NFC label of the merchandise item. Upon receiving confirmation from the user, the terminal may associate the merchandise item with the portable device. For example, the terminal may include a monitor to display the merchandise information (e.g., price, description, expiration date, etc.). The terminal may receive user input confirming the desire to acquire the merchandise item in any suitable manner, including but not limited to, a voice command received over an audio input, a touch command confirming a selection on a touch screen, a selection by pressing a button, etc.

When the consumer is ready to check-out/leave the resource provider location, the frictionless payment is facilitated by leaving the portable device, for example, in a designated location or surrendering it to a retail associate. The disposal of the portable device immediately completes the transaction for items associated with the portable device using preauthorized user account previously associated with the portable device, without requiring further interaction with the consumer. The resource provider (e.g., the resource provider computer) then sends a transaction authorization request to a transaction processing entity to complete the transaction. Sending the transaction request automatically deactivates the NFC tags associated with the items (e.g., merchandise) on the list of items associated with the portable device. In the event that the portable device, or merchandise with an active NFC tag, is removed from the resource provider location without proper check-out process, the pre-authorized user account may be used to recoup the cost of removed merchandise and/or the portable device.

The techniques described herein may not be limited to a purchase transaction and may be deployed in other settings where frictionless check-out may be desired. For example, the resource provider system may be deployed at a library where tapping the portable device and the NFC label of a book on a terminal will associate the book with the user account temporarily assigned to the portable device. When the user leaves the library and surrenders the portable device, all books that were associated with the portable device may be added to the user account of the user.

Prior to discussing embodiments, description of some terms may be helpful in understanding embodiments.

A "portable device" may refer to any suitable device that may be portable. It may be used as part of a transaction, such as to identify a user account for a list of items associated with the portable device. A portable device may be in any suitable form. For example, suitable portable devices may include physical tokens that are hand-held and compact so that they can fit into a user's pocket (e.g., pocket-sized). They may include cards, keychain devices, fobs, etc. Other examples of portable devices include any type of wearable device, such as a ring, bracelet, glasses, etc. Such devices can operate in either a contact or contactless mode. The portable device may include a NFC tag that can be read by a reader in a predetermined location. The portable device may be a simple device in the sense that the portable device is not configured to communicate over open networks, (e.g., the Internet). The portable device may be a simple device with a limited (e.g., small) or no display, no user-input functionality (e.g., no keyboard or buttons), and/or no ability to produce audio signals.

A "contactless" communication may be a communication in which data is exchanged between two devices without the need for the devices to be physically coupled. Without limiting the generality of the foregoing, "contactless" communication can include data transmissions by near-field communication (NFC) transceiver, machine readable codes such as QR codes, laser, radio frequency, infrared communications, or other radio frequency or wireless communication protocols such as Bluetooth, Bluetooth low-energy (BLE), Wi-Fi, iBeacon, etc.

A "terminal" may be any suitable device for communicating with a user and a resource provider computer. A terminal may be a physical device in any suitable form, provided at a resource provider location. Some examples of terminals include, computers, tablet computers, hand-held specialized readers, set-top boxes, kiosks, security systems, access systems, and the like. A terminal may use any suitable contact or contactless mode of operation to send or receive data from, or associated with, a machine-readable tag or label. In some embodiments, the terminal may include a reader, a processor, a computer-readable medium and an output device (e.g., a screen, a display device and/or a speaker). A reader may include any suitable contact or contactless mode of operation. For example, exemplary readers can include NFC capable radio frequency (RF) antennas to read NFC tags or labels.

A "resource provider" can be an entity that provides resources (e.g., goods, services, access to secure data, access to locations, or the like) during a transaction. For example, a resource provider can be a merchant, a venue operator, a building owner, a governmental entity, etc. A "merchant" may typically be an entity that engages in transactions and can sell goods or services, or provide access to goods or services.

As used herein, "payment information" may include any relevant information for performing a payment. For example, the payment information may include any sensitive account information and/or personal information that may be used to identify and/or authenticate a payment account at an issuer. Further, in some embodiments, the payment information may also include merchant information, consumer information, mobile device information, routing information, or any other relevant information that may be used to administer, manage, and communicate payment transactions. As such, payment information may include both sensitive and non-sensitive information. Additionally, the payment information may include only a portion of account information, personal information, etc., that may be used to perform a transaction. For example, payment information may include the sensitive information associated with a transaction or account and may be sent along with other non-sensitive information that may not be considered payment information (e.g., transaction amount, etc.).

As used herein, "payment credentials" may include any information that allows a processor to identify, verify, and/or process a payment transaction using a consumer account. For example, a payment credential may include an account identifier (e.g., primary account number (PAN)), a token (e.g., account identifier substitute), expiration date, card verification value (e.g., CVV, CVV2, dCVV, etc.), a dynamic cryptogram or dynamic value (e.g., dynamic authentication data), personal information associated with an account (e.g., address, etc.), an account alias, or any other relevant information.

A "transaction processor" or "transaction processing network/entity" may include any entity that is associated with processing a transaction. For example, a merchant, a mobile device, a merchant application or other mobile application on a mobile device (e.g., an acquirer application or payment service provider application), an acquirer computer, a payment processing network, and any other entity in a transaction processing eco-system may be a transaction processor.

The transaction processing network may include data processing subsystems, networks, and operations used to support and deliver certificate authority services, authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may include one or more server computers.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein, an "issuer" may typically refer to a business entity (e.g., a bank) that maintains financial accounts for a user and often issues a portable consumer device such as a credit or debit card to the user. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer, acquirer computer, payment processing network, andissuer computer) to enable communications, or to perform one or more of the functions described herein.

Details of some embodiments of the present disclosure will now be described in greater detail. For clarity, a certain number of components are shown in the subsequent figures. It is understood, however, that embodiments of the disclosure may include more than one of each component. In addition, the components in each figure may communicate via any suitable communication medium (including the internet), using any suitable communication protocol.

FIG. 1 illustrates a block diagram of an exemplary machine-readable tag system, according to some embodiments. A tag, as used herein, may include a near field communication (NFC) tag 100 (e.g., NTAG213, ISO 14443-A tag). An exemplary NFC tag 100 may include a radio frequency identification (RFID) transponder that operates at a predetermined frequency (e.g., 13.56 MHz).

According to various embodiments, a first machine-readable tag (e.g., NFC tag) may be associated with a portable device 102, and a second machine-readable tag (e.g., NFC label) may be associated with a merchandise item 104 (e.g., an item). Each machine-readable tag may be created or programmed to uniquely identify the item that it is coupled to. For example, the first machine-readable tag uniquely identifies the portable device 102, and the second machine-readable tag uniquely identifies the merchandise item 104. A third machine-readable tag may uniquely identify a different portable device or a different merchandise item.

The exemplary NFC tag 100 coupled to the portable device 102 or the merchandise item 104 may include, for example, a NTAG213 adhesive tag designed to comply with ISO 14443 Type A specification. The NFC tag 100 may include an RFID programmable chip suitable for product authentication and being used as a label 106 on merchandise items 104. According to various embodiments, the NFC tag 100 does not require a source of power. The NFC tag 100 may be activated by proximity to an electromagnetic field generated by an NFC reader (e.g., an NFC reader coupled to a terminal). That is, the NFC tag 100 is powered via magnetic induction by the NFC reader of the terminal. According to various embodiments, a resource provider may program multiple NFC tags, each with a unique identifier to correspond to a single portable device 102 or a single merchandise item 104. The programmed NFC tag 100 may be securely fastened to the portable device 102 orthe merchandise item 104. In some embodiments, the portable device 102 may be customized based on merchant brand and experience (e.g., custom logo, colors, shape, etc.).

Figure 2:
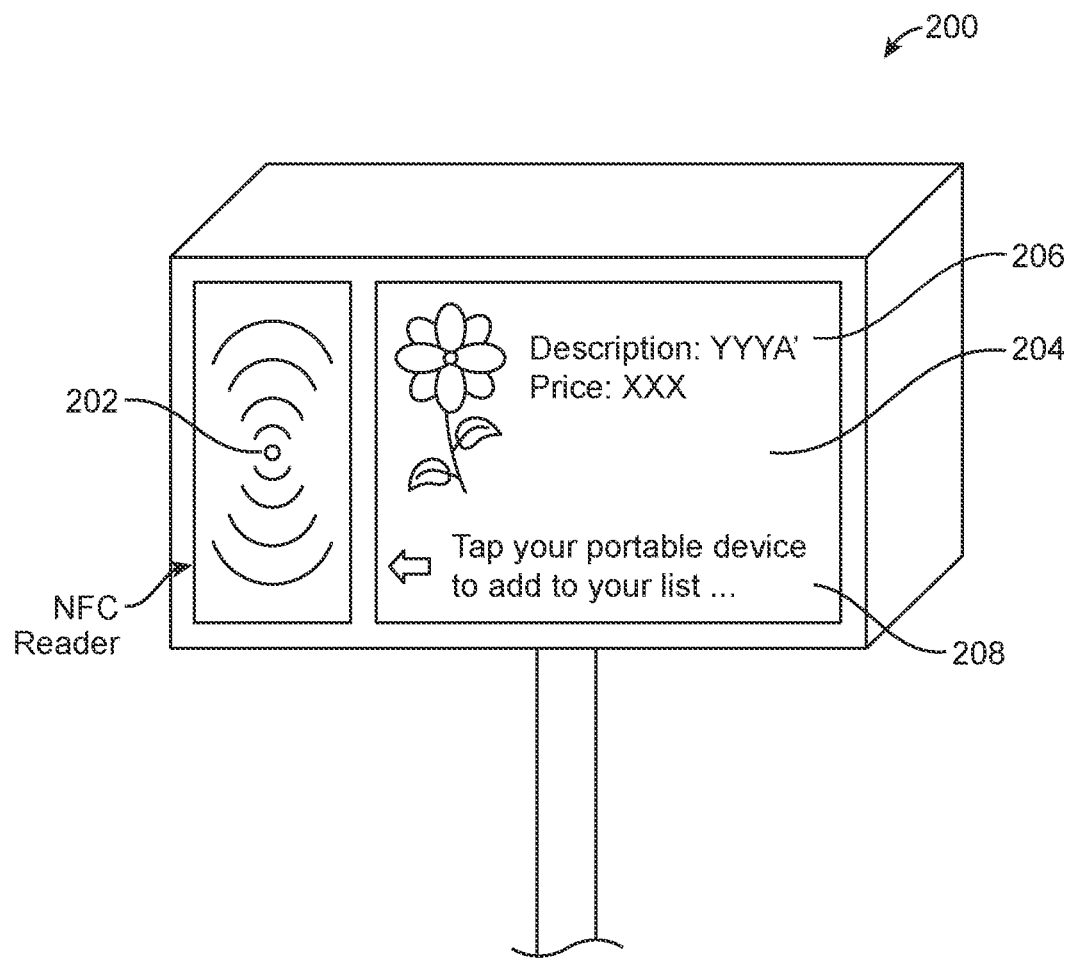
FIG. 2 shows a block diagram of an exemplary terminal that may be used with some embodiments.

According to various embodiments, the resource provider may deploy one or more terminals at a resource provider location. FIG. 2 illustrates a block diagram of an exemplary terminal, according to some embodiments. The terminal 200 may be configured to interact with the portable device 102 as well as the merchandise items 104. For example, the terminal 200 may be programmed to identify a merchandise item 104 by reading the NFC label 106 affixed or coupled to the merchandise item 104. When the merchandise item 104 is tapped to or brought in close proximity of a reader 202 (e.g., NFC reader) of the terminal 200, the terminal 200 reads data (e.g., merchandise item ID) from the NFC label 106 of the merchandise item 104.

As further shown in FIG. 2, the terminal 200 may include a display (e.g., monitor) 204 to display information. For example, the terminal 200 may display merchandise information 206 (e.g., a description of the merchandise item 104 and price) associated with the merchandise item 104 on the display 204. In some embodiments, the display 204 may be a touch screen that can receive inputs from the consumer. The terminal 200 may also display instructions 208 to the consumer. For example, the terminal 200 may ask the consumer to tap the portable device 102 to the reader 202 if the consumer would like to associate the item 104 with the portable device 102. For example, the terminal 200 may be programmed to identify the portable device 102 by reading the NFC tag 100 affixed or coupled to the portable device 102. When the portable device 102 is tapped to or brought in close proximity of a reader 202 (e.g., NFC reader) of the terminal 200, the terminal 200 reads data (e.g., portable device ID) from the NFC tag 100 of the portable device 102. This process is described below in greater detail in connection with FIG. 3.

Figure 3:
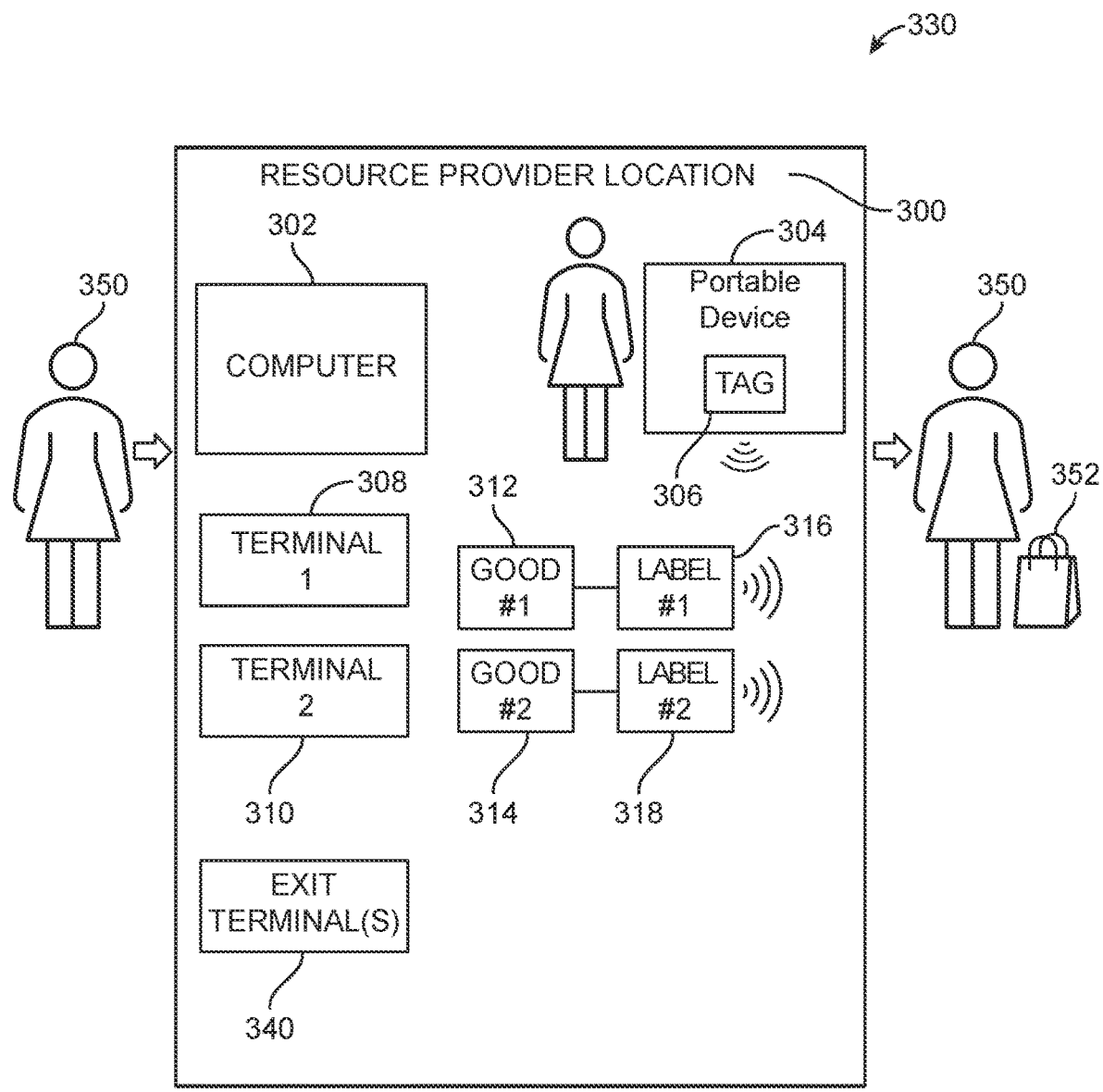
FIG. 3 shows a block diagram of an exemplary environment for performing a portable device-based transaction, according to some embodiments.

FIG. 3 shows a block diagram of an exemplary environment for performing a portable device-based transaction, according to some embodiments. In some embodiments, the portable device described herein may be specific to a resource provider and/or to a specific location of the resource provider. In other embodiments, the portable device may be a generic, NFC capable portable device.

A consumer 350 may enter a resource provider location 300 of a resource provider. The resource provider location may include a resource provider system 330 including a resource provider computer 302, at least one portable device 304 associated with a machine-readable tag 306 (e.g., an NFC tag) that uniquely identifies the at least one portable device 304. For example, the portable device 304 may be in form of a bracelet, a ring or a fob that they consumer 350 may wear or attached to his/her person or personal items. The resource provider system 330 may also include one or more merchandise items 312, 314 each associated with a unique label 316, 318 (e.g., NFC label) that uniquely identifies the merchandise item where it is attached. The resource provider system 330 may also include one or more terminals 308, 310 that are configured to read the machine-readable tag 306 and identify the portable device 304, read the machine-readable label 316, 318 and identify the merchandise item 312, 314, respectively.

As shown in FIG. 3, all components of the resource provider system 330 is provided within the resource provider location 300 of the resource provider. In some embodiments, the consumer 350 may be allowed to take the portable device 304 outside of the resource provider location 300. However, removing the portable device 304 from the resource provider location 300 may eliminate the functionality of the portable device 304 (e.g., the NFC tag 306 may be disactivated).

According to various embodiments, one or more of the elements of the resource provider system 330 may communicate over a local area network (LAN) that is operational within the confines of the resource provider location 300. In some embodiments, only the resource provider computer 302 may be configured to communicate with entities outside of the resource provider location 300.

When the consumer 350 enters the resource provider location 300, the consumer 350 may perform pre-authorization of a payment instrument, such as physical or virtual credit card, using the resource provider computer 302 (or a payment terminal coupled to the resource provider computer 302). The consumer 350 may present a payment device (e.g., a payment card, a smart device with an electronic wallet, etc.) to the resource provider computer 302. The resource provider computer 302 may communicate with a transaction processing network or an issuer of the payment device via an acquirer. The transaction processing network or the issuer may pre-authorize the payment device for a predetermined amount that is likely to cover the expenses at the resource provider location. The resource providercomputer 302 may obtain the pre-authorization of the payment device by establishing a network connection to the external entity (e.g., transaction processing network, issuer, acquirer). Upon pre-authorization, the resource provider computer 302 may create an association between the payment device and the portable device 104. For example, the resource provider computer 302 may store a data pair including the preauthorization confirmation and the portable device 304 identifier. The consumer 350 is given the portable device 304, which is associated with the machine-readable tag 306 that uniquely identifies the portable device 304.

The consumer 350 may then browse the resource provider location 300, and select at least one merchandise item 312. The consumer 350 may then tap the NFC label 316 of the selected merchandise item 312 on a terminal 308. According to various embodiments, the NFC label 316 does not require dedicated power source to function. When the NFC label 316 is in close proximity of the terminal 308, the reader of the terminal 308 may transfer energy to a transponder embedded in the NFC label 316 through the electromagnetic waves emitted by the reader. The NFC label 316 (or the transponder of the label) may use this radio frequency (RF) to power up.

Upon tapping the NFC label 316 on the terminal 308, the terminal 308 may read the NFC label 316 via its reader (e.g., NFC reader), acquire data (e.g., merchandise item ID) stored on the NFC label 316, identify the merchandise item 312 based on the acquired data, and output information associated with merchandise item 312. For example, the terminal 308 may display the information (e.g., description, price of the selected merchandise item) or may play an audio to output the information. In some embodiments, the terminal 308 may ask the consumer 350 to tap the portable device 304 to the reader of the terminal 308 if the consumer 350 would like to acquire (e.g., purchase) the merchandise item 312. If the terminal 308 detects the portable device 304 in close proximity (or being tapped to the reader), the terminal 308 may add an entry identifying the merchandise item 312 on a list of merchandise items associated with the portable device 304. If the merchandise item 312 is the first item that the consumer 350 is purchasing, the terminal 308 may generate the list, and add the entry identifying the merchandise item 312 on the list.

The consumer 350 may select an additional merchandise item 314. The consumer 350 may then tap the NFC label 318 of the selected merchandiseitem 314 on a same terminal 308 or different terminal 310. The terminal 308, 310 may read the NFC label 318 via its reader (e.g., NFC reader), identify the merchandise item 314 and output information associated with merchandise item 314. The terminal 308, 310 may ask the consumer 350 to tap the portable device 304 to the reader of the terminal 308, 310 if the consumer 350 would like to acquire the merchandise item 314. If the terminal 308, 310 detects the portable device 304 in close proximity (or being tapped to the reader), the terminal 308, 310 may add an entry identifying the merchandise item 314 on the list of merchandise items associated with the portable device 304.

In some embodiments, the consumer 350 may first tap the portable device 304 to the reader of the terminal 308, 310 prior to tapping the NFC label 316, 318 to the terminal 308, 310. This way, the merchandise items 312, 314 will be automatically added to the list when the NFC label is tapped on the terminal 308, 310 after the portable device 304.

According to various embodiments, to reduce the risk of theft, the NFC labels 316, 318 scanned by the terminal 308, 310 with follow up tap by a portable device 304 may be marked as "inactive" to allow the consumer 350 to leave the resource provider location 300 without further interaction/friction, and without triggering an audible or visual alarm. Here, all communication between the portable device 304, merchandise label 316, the terminal 308 and the computer 302 (which may store a back-end inventory management system) happens within the resource provider location network, thus reducing network communication bandwidth and latency for communications over external/open networks.

When consumer 350 is ready to check-out/leave the resource provider location 300, the frictionless payment is facilitated by simply leaving the portable device 304 in a designated location or surrendering it to a retail associate. The consumer 350 them walks out with the merchandise items 352 on the list associated with the portable device. Surrendering the portable device 304 may immediately complete the transaction of the merchandise items 312, 314 on the list associated with the portable device 304 using the preauthorized payment account, without requiring further interaction with the consumer 350.

At this stage, the resource provider computer 302 may communicate with the external entity (e.g., transaction processing network, issuer, acquirer) to complete the transaction. This is the second time the resource provider computer 302 has to perform a network communication with an external entity, the first time being during the preauthorization request of the user account or the payment device. Upon the consumer 350 exiting the resource provider location, the portable device 304 is disassociated from the payment account of the consumer. The portable device 304 becomes available for a re-pairing or association with a different payment account of a subsequent consumer.

In the event that the portable device 304 (which is not disassociated from the payment account of the consumer), or one or more merchandise items 312, 314 with still activated NFC tags, is removed from the resource provider location 300 without proper check-out, the pre-authorized payment device may be used to recoup the cost of removed merchandise items and/or the portable device 304.

According to various embodiments, adding a merchandise item on the list may deactivate the NFC label of that merchandise item. On the other hand, after tapping the NFC label of the merchandise item on the terminal, the consumer does not tap the portable device on the terminal, indicating that the consumer does not wish to purchase the merchandise item, the NFC label of the merchandise item remains active. The resource provider location may include exit terminals 340 (e.g., readers) at the exit of the resource provider location 300. According to various embodiments, the resource provider system 330 may check the status of NFC label of every item that passes though the exit terminals 340. If the exit terminals 340 identify an active NFC label passing through, the resource provider system 330 may identify a potential theft and output an alarm (e.g., an alarm sound, flashing lights, closing of the gates, etc.).

Figure 4:
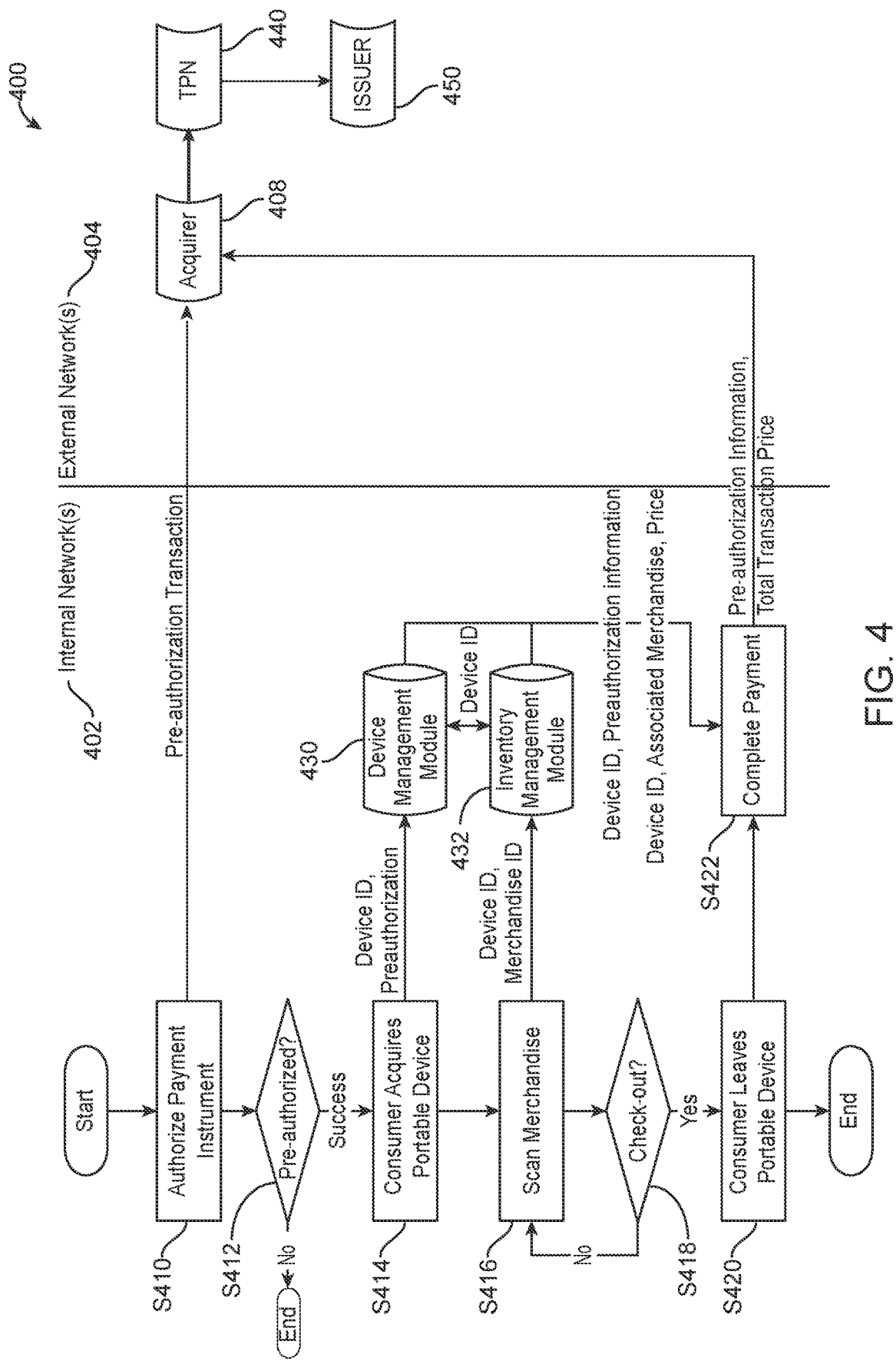
FIG. 4 shows a flow diagram of an exemplary method for performing a portable device-based transaction, according to some embodiments.

FIG. 4 shows a flow diagram of an exemplary method for performing a portable device-based transaction, according to some embodiments. As shown in FIG. 4, most of the steps of the flow diagram 400 are performed via communications over an internal network 402 (e.g., a local area network, a closed network) which is a private and secured network without access to external entities. The internal communication network may be exclusive to the terminals (including the exit terminals) and the resource provider computer (including a device management module and an inventory management module, described below). The resource provider computer 302 may be the only device in the resource provider system 330 that is configured to communicate with external entities such as acquirer 408, transaction processing network 440, issuer 450 over an external network 404 (e.g., Internet, open network). According to various embodiments, the communications between the resource provider computer 302 and the external entities may be secured (e.g., encrypted).

When the consumer enters the resource provider location, the consumer presents a payment device (e.g., a payment card, a smart device with an electronic wallet) to a resource provider computer. The payment device may be associated with a user account (e.g., payment account) of the consumer issued by an issuer 450.

At step S410, the resource provider computer may transmit a communication to the transaction processing server computer over the external communication network to confirm validity of the payment account. For example, the communication may include a pre-authorization request message to the transaction processing network 440, or the issuer 450 via the acquirer 408 over a first communication channel that is established using the external network. The pre-authorization request message may include an identifier for the payment account, and a predetermined amount that will be put on hold on the payment account. In some embodiments, the communication may include a zero dollar authentication request message, which confirms the validity of the payment account. Confirming validity of the payment account may include checking whether the payment account is blacklisted or a restriction is associated with the payment account.

If the pre-authorization request is not approved (e.g., "No" at step S412), the flow ends, and the consumer is not allowed to conduct transactions at the resource provider location.

Upon determining that the pre-authorization request has been approved (e.g., "Success" at step S412), the resource provider computer temporarily associates a portable device with the payment account. According to various embodiments, the portable device may include a wearable device that includes a machine-readable tag. For example, the machine-readable tag may include a RFID tag or a NFC tag. The resource provider computer may store an association between the payment account and an identifier for the portable device at a memory location using a device management module 430 (described in greater detail in connection with FIG. 5). For example, the device management module may temporarily store the pre-authorization response message along with the portable device ID. The entry associating the payment account of the consumer (e.g., the pre-authorization response message) and the portable device ID may be deleted when the consumer surrenders the portable device upon exiting the resource provider location. The portable device is then released to the consumer at step S414. According to various embodiments, the portable device may include a wearable device that is not connected to the Internet.

The consumer may then browse the resource provider location and may identify a merchandise item for purchase. The consumer may tap the merchandise item on a terminal provided within the resource provider location. The terminal may be communicatively coupled to the resource provider computer over the internal communication network. At step S416, the terminal may read a label associated with the merchandise item. For example, the label may include a NFC label. A reader of the terminal may acquire the data (e.g., merchandise item ID) stored at the NFC label associated with the merchandise item. In some embodiments, the terminal may identify the merchandise item using the acquired data, identify information associated with the merchandise item, and output the information on a display device of the terminal. If the consumer wishes to proceed with purchasing the merchandise item, the consumer may tap the portable device to the terminal. The terminal may read the machine-readable tag associated with the portable device, and acquire the portable device ID. The terminal may then transmit to the resource provider computer a request to associate the merchandise item with the portable device. The resource provider computer may associate the merchandise item with the portable device. The resource provider computer may receive additional requests from the one or more terminals within the resource provider location to associate merchandise items with the portable device. For example, the resource provider computer may generate a list (e.g., an entry) of merchandise item ID(s) to be associated with the portable device ID at an inventory management module 432.

While the consumer is still in the resource provider location, the resource provider computer may receive a subsequent request to associate an additional item with the portable device. The request may be transmitted from the or more terminals via the internal communication network. The resource provider computer may incorporate the additional item in the list such that the transaction authorization request transmitted to the processing server computer via the external communication network includes the one or more items on the list, including the additional item.

In some embodiments, one or more of the terminals may generate and store the list. For example, a terminal among the one or more terminals may generate the list of one or more merchandise items associated with the portable device. The terminal may provide the list to the inventory management module 432. Alternatively, the terminal may store the list at a shared memory that is accessible by the resource provider computer.

At step S418, the resource provider may receive over the internal communication network a request to check-out. For example, the resource provider computer may detect by the portable device being returned at the predetermined location (step S420). In some embodiments, the resource provider computer may detect by the portable device and/or the merchandise item(s) passing through an exit terminal provided at an exit of the resource provider location. The detection of the portable device and/or the merchandise item(s) passing through the exit terminal may be acknowledged as a request to check-out.

Upon determining that the consumer left the resource provider location, and/or the portable device is surrendered, the resource provider computer may disassociate the portable device from the payment account.

The resource provider computer may generate a transaction authorization request for the one or more items associated with the portable device. For example, the resource provider computer may retrieve the list of merchandise items associated with the portable device ID from the inventory management module, and include a total transaction amount in the transaction authorization request. In some embodiments, the resource provider computer may also include the preauthorization confirmation in the transaction authorization request. At step 422, the resource provider computer may transmit the transaction authorization request via to the acquirer 408 over the external communication network 404. This may be the second time a communication is sent over the external communication network 404 in connection with this particular transaction, the first time being the preauthorization request sent at step S410.

An authorization request message may be generated by merchant computer 302 and then forwarded to the acquirer computer 408. After receiving the authorization request message, the acquirer computer 408 sends the authorization request message to the transaction processing network 440. The transaction processing network 440 then forwards the authorization request message to the corresponding issuer computer 450 associated with an issuer that issued the payment device of the consumer 350.

An "authorization request message" may be an electronic message that is sent to a transaction processing network 440 and/or an issuer 450 of a payment card to request authorization for a transaction. An authorization request message according to some embodiments may comply with ISO 8583, which is a standard for systems that exchange electronic transaction information associated with a payment made by the consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 450 receives the authorization request message, the issuer computer 450 sends an authorization response message back to the transaction processing network 440 to indicate whether the current transaction is authorized (or not authorized). The transaction processing network 440 then forwards the authorization response message back to the acquirer computer 408. In some embodiments, transaction processing network 440 may decline the transaction even if issuer computer 450 has authorized the transaction, for example depending on a value of the fraud risk score. The acquirer computer 408 then sends the response message back to the resource provider computer 302.

An "authorization response message" may be an electronic message reply to an authorization request message generated by an issuing financial institution 450 or a transaction processing network 440. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network 440) to the resource provider computer 302 that indicates approval of the transaction. The code may serve as proof of authorization. As noted above, in some embodiments, a transaction processing network 440 may generate or forward the authorization response message to the merchant.

At the end of the day, a normal clearing and settlement process can be conducted by the transaction processing network 440. A clearing process is a process of exchanging financial details between an acquirer and an issuer to facilitate posting to a customer's payment account and reconciliation of the user's settlement position.

Figure 5:
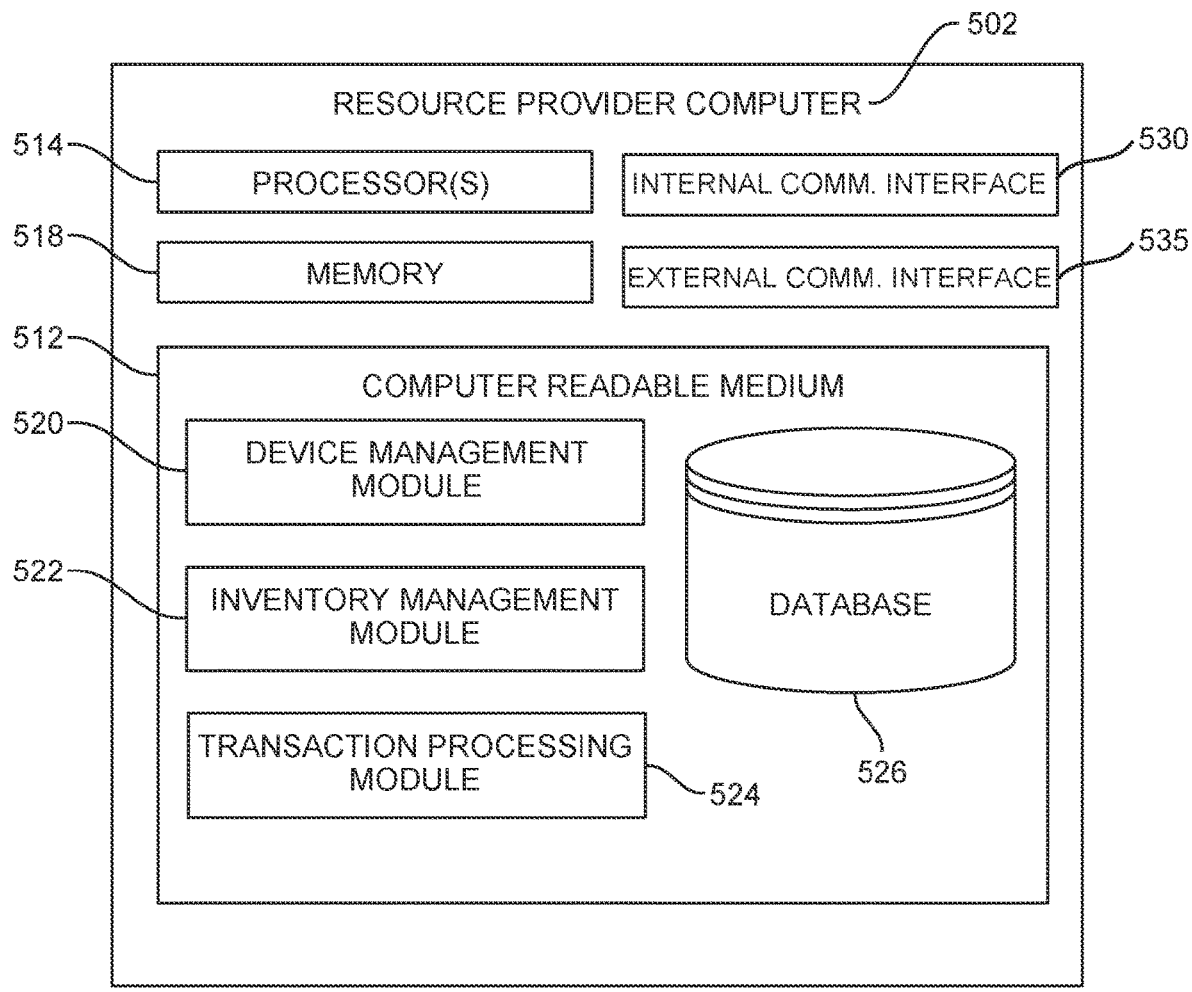
FIG. 5 shows a block diagram of an exemplary resource provider computer apparatus, according to some embodiments.

FIG. 5 is a high level block diagram of a resource provider computer that may be used to implement any of the techniques described above. The resource provider computer 502 may be provided in form of a server computer, as described above. The subsystems shown in FIG. 5 may be interconnected via a system bus. The interconnection via the system bus allows a central processor 514 to communicate with each subsystem and to control the execution of instructions from system memory or the fixed disk, as well as the exchange of information between subsystems. The internal communication interface 530 may be used to connect the resource provider computer 502 to a local area network while the external communication interface 535 may be used to connect the resource provider computer 502 to a wide area network such as the Internet.

The system memory 518 and/or the fixed disk may embody a computer-readable medium 512 storing the device management module 520, an inventory management module 522 and a transaction processing module 524. A database 526 may be provided for storing information such as portable device ID, merchandise information (e.g., description, price) associated with a merchandise ID.

The device management module 520, along with the central processor 514, may store association of a portable device with a payment account of a consumer. For example, the device management module 520 may store (e.g., at the database 526) the preauthorization confirmation message received from the issuer 450 for a particular payment account along with a portable device ID. This way, the resource provider computer 502 may generate and store an association between the payment account and the portable device assigned to the holder of the payment account (e.g., the consumer). When the resource provider computer 502 receives a check-out request, the resource provider computer 502 retrieves the portable device ID and the preauthorization confirmation message associated with the portable device ID from the device management module 520.

The inventory management module 522, along with the central processor 514, may store information about one or more merchandise items, as well as a list of merchandise items associated with a portable device ID at a given time. For example, the inventory management module 522 may store (e.g., at the database 526) inventory information such as description of a merchandise item, price of the merchandise item, etc. The inventory management module 522 may also receive requests from the one or more terminals for associating a merchandise item with a portable device. The inventory management module 522 may generate and/or store (e.g., at the database 526) a list of merchandise items (e.g., merchandise item IDs) associated with the portable device (e.g., the portable device ID). When the resource provider computer 502 receives a check-out request, the resource provider computer 502 retrieves the portable device ID, the list of merchandise items associated with the portable device, and a total price of the merchandise items from the inventory management module 522.

The transaction processing module 524, along with the central processor 514, enables the resource provider computer 502 to generate the preauthorization request, and/or the transaction authorization request that will be communicated to the acquirer computer over the external network.

Embodiments provide various advantages over conventional systems. The resource provider system does not require expensive or complex hardware to meet rigorous security requirements (e.g., PCI DSS and PCI PTS POI security standards) because the portable device and/or the terminals deployed at the resource provider location are not payment instruments or payment terminals. Moreover, embodiments rely on communications over a local network (e.g., connectivity between the terminals and the resource provider computer is limited to an environment within the resource provider location) thereby reducing risk of fraud by eavesdroppers, or comprising payment information. Moreover, limiting the communication between the terminals and the resource provider computer to an environment within the resource provider location (e.g., to a local area network) reduces network communication bandwidth and latency over the communication channel and thus increases responsiveness of these devices.

Embodiments decrease the technical complexity (e.g., number of chips, memory, CPU, storage, etc.), cost of wearable tokens and retail devices facilitating payments (e.g., terminals) compared to the more expensive smart wearables (e.g., Apple Watch) and PTS POI payment terminals. Because the terminals at resource provider location described herein do not handle sensitive information (e.g., payment credentials), embodiments increase the security of the account data, by reducing the number of devices in the resource provider location handling sensitive information down to the resource provider computer.

Moreover, embodiments increase the responsiveness of the interaction between the consumer and the terminals at resource provider location by allowing all network communication to be within the internal network(s).

Embodiments reduce fraud by pre-authorizing the payment device of the consumer prior to the transaction. If the payment device is expired, blacklisted, or does not have sufficient funds (e.g., a threshold minimum funds), the pre-authorization would be declined and the consumer would not be allowed to initiate a transaction (or would not be allowed to start shopping).

Embodiments reduce the cost of theft by retaining the payment data "on file" while the consumer is at the resource provider location.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the embodiments may become apparent to those skilled in the art upon review of the disclosure. The scope of the invention may, therefore, be determined not with reference to the above description, but instead may be determined with reference to the pending claims along with their full scope or equivalents.

It may be understood that the embodiments as described above can be implemented in the form of control logic using computer software in a modular or integrated manner. Based on the disclosure and teachings provided herein, a person of ordinary skill in the art may know and appreciate other ways and/or methods to implement the embodiments using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
temporarily associating, by a resource provider computer of a resource provider, a portable device of the resource provider with a first user account of a first user, wherein the portable device comprises a machine-readable tag, wherein the portable device is configured as a read-only device for exclusive one way communication with one or more terminals within a location of the resource provider;
transmitting, by the resource provider computer, a preauthorization request including the first user account to an issuer of the first user account;
receiving, by the resource provider computer from the issuer of the first user account, a confirmation of preauthorization indicating that the first user account is valid;
receiving, by the resource provider computer from the one or more terminals via an internal communication interface, at least one request to associate one or more items with the portable device, wherein the internal communication interface connects the resource provider computer to an internal communication network, which is local area network that is exclusive to the one or more terminals and the resource provider computer;

receiving, by the resource provider computer via the internal communication network, a request to check-out;

generating, by the resource provider computer, a transaction authorization request for the one or more items associated with the portable device;

transmitting, by the resource provider computer to a processing server computer, the transaction authorization request via an external communication network, wherein the transaction authorization request includes the confirmation of preauthorization;

disassociating, by the resource provider computer, the portable device from the first user account; and performing, by the resource provider computer, at least one of temporarily associating the portable device with a second user account of a second user, or deactivating the portable device eliminating future use when the portable device exits the location.

2. The method of claim 1, wherein receiving the request to check-out further comprises:

detecting, by the resource provider computer via the internal communication network, the portable device being returned at a predetermined location or passing through an exit terminal; and detecting, by the resource provider computer via the internal communication network, the one or more items passing through the exit terminal.

3. The method of claim 2, wherein the resource provider computer, the one or more terminals and the exit terminal being provided at a same resource provider location.

4. The method of claim 1, further comprising:

reading, by a terminal among the one or more terminals communicatively coupled to the resource provider computer over the internal communication network, a label associated with an item among the one or more items;

reading, by the terminal, the machine-readable tag associated with the portable device;

transmitting, by the terminal to the resource provider computer via the internal communication network, a request to associate the item with the portable device; and associating, by the resource provider computer, the item with the portable device.

5. The method of claim 4, wherein the label includes a NFC label.

6. The method of claim 4, further comprising, prior to reading the machine-readable tag associated with the portable device:

acquiring, by the terminal, data stored at the label associated with the item;

identifying, by the terminal, the item using the acquired data;

identifying, by the terminal, information associated with the item; and outputting, by the terminal, the information associated with the item.

7. The method of claim 1, wherein the preauthorization request is a zero dollar authentication request message.

8. The method of claim 1, wherein confirming validity of the first user account includes checking whether the first user account is blacklisted or a restriction is associated with the first user account.

9. The method of claim 1, wherein the machine-readable tag includes a RFID tag or a NFC tag.

10. The method of claim 1, wherein the portable device is a wearable device that is not connected to the Internet.

11. The method of claim 1, wherein each one of the one or more items is associated with an individual label readable by the one or more terminals.

12. A system comprising:

a resource provider computer of a resource provider comprising one or more processors, and a memory storing instructions that, when executed by the one or more processors, cause the one or more processors to:

temporarily associate a portable device of the resource provider with a first user account of a first user, wherein the portable device comprises a machine-readable tag, wherein the portable device is configured as a read-only device for exclusive one way communication with one or more terminals within a location of the resource provider;

transmit a preauthorization request including the first user account to an issuer of the first user account;

receive, from the issuer of the first user account, a confirmation of preauthorization indicating that the first user account is valid;

receive, from the one or more terminals via an internal communication network, at least one request to associate one or more items with the portable device;

receive, via an internal communication interface, a request to check-out, wherein the internal communication interface connects the resource provider computer to an internal communication network, which is local area network that is exclusive to the one or more terminals and the resource provider computer;

generate a transaction authorization request for the one or more items associated with the portable device;

transmit, to a processing server computer, the transaction authorization request via an external communication network, wherein the transaction authorization request includes the confirmation of preauthorization;

disassociate the portable device from the first user account; and perform at least one of temporarily associating the portable device with a second user account of a second user, or deactivating the portable device eliminating future use when the portable device exits the location.

13. The system of claim 12, wherein a terminal among the one or more terminals is further configured to:

read a label associated with a selected item among the one or more items;

identify the selected item using data retrieved from the label based on reading the label;

read the machine-readable tag associated with the portable device; and identify the portable device using data retrieved from the machine-readable tag based on reading the machine-readable tag.

14. The system of claim 13, wherein the terminal among the one or more terminals is further configured to:

generate a list of items associated with the portable device, wherein the list incorporates the one or more items including the selected item; and store the list at a shared memory that is accessible by the resource provider computer, wherein the transaction authorization request transmitted to the processing server computer via the external communication network includes the one or more items on the list.

15. The system of claim 13, wherein the terminal is further configured to, prior to reading the machine-readable tag associated with the portable device:
- acquire data stored at the label associated with the selected item;
- identify the selected item using the acquired data;
- identify information associated with the selected item; and
- output the information associated with the selected item.

16. The system of claim 13, wherein the machine-readable tag includes a RFID tag or a NFC tag, and wherein the label includes a NFC label.

17. The system of claim 12, wherein the instructions, when executed by the one or more processors, further cause the one or more processors to:
- generate a list of the one or more items associated with the portable device;
- receive, from the one or more terminals via the internal communication network, a subsequent request to associate an additional item with the portable device; and
- incorporate the additional item in the list, wherein the transaction authorization request transmitted to the processing server computer via the external communication network includes the one or more items on the list.

18. The system of claim 12, further including the portable device.

* * * * *